United States Patent
Hu et al.

(10) Patent No.: US 10,755,374 B2
(45) Date of Patent: Aug. 25, 2020

(54) VEHICLE MANAGEMENT METHOD, SYSTEM AND SERVER, AND VEHICLE

(71) Applicant: BEIJING MOBIKE TECHNOLOGY CO., LTD., Beijing (CN)

(72) Inventors: Weiwei Hu, Beijing (CN); Hongdu Jin, Beijing (CN); Jia Zou, Beijing (CN)

(73) Assignee: BEIJING MOBIKE TECHNOLOGY CO., LTD., Beijing (CN)

( * ) Notice: Subject to any disclaimer, the term of this patent is extended or adjusted under 35 U.S.C. 154(b) by 330 days.

(21) Appl. No.: 15/796,420

(22) Filed: Oct. 27, 2017

(65) Prior Publication Data
US 2018/0322603 A1 Nov. 8, 2018

(30) Foreign Application Priority Data
May 5, 2017 (CN) .......................... 2017 1 0313362

(51) Int. Cl.
*G06Q 50/30* (2012.01)
*H04W 12/06* (2009.01)
(Continued)

(52) U.S. Cl.
CPC ............... *G06Q 50/30* (2013.01); *B62H 5/20* (2013.01); *G06Q 30/0645* (2013.01);
(Continued)

(58) Field of Classification Search
CPC .... G06Q 50/30; G06Q 30/0645; G06Q 10/02; H04W 12/06; H04L 63/08; B62H 5/20;
(Continued)

(56) References Cited

U.S. PATENT DOCUMENTS

2004/0036582 A1* 2/2004 Harvey .................. B60R 25/04
340/426.1
2007/0200663 A1* 8/2007 White ................... B60R 25/255
340/5.31
(Continued)

FOREIGN PATENT DOCUMENTS

CN 105825374 A 8/2016

OTHER PUBLICATIONS

Umezawa, Katsuyuki, et. al.; "A Study on User Authentication Infrastructure for Next Generation Telematics"; 2008 IEEE Conference on Vehicular Electronics and Safety; Sep. 22-24, 2008 (Year: 2008).*

*Primary Examiner* — Rupangini Singh
*Assistant Examiner* — Dione N. Simpson
(74) *Attorney, Agent, or Firm* — Hultquist, PLLC; Steven J. Hultquist (57) ABSTRACT

The present disclosure relates to a vehicle management method, system and server, and a vehicle. The vehicle management method comprises: acquiring by a client device a vehicle identification; receiving by a vehicle management server an authentication request from the client device, the authentication request including the vehicle identification and a user identification of the client device; authenticating by the vehicle management server the vehicle identification and the user identification to permit a continuously available state of the vehicle; sending by the vehicle management server a use permission of the continuously available state to a vehicle; and receiving by the vehicle the use permission to continue its available state. According to one embodiment of the present disclosure, the user experience can be improved.

6 Claims, 4 Drawing Sheets

(51) Int. Cl.
*H04L 29/06* (2006.01)
*B62H 5/20* (2006.01)
*G06Q 30/06* (2012.01)
*B62H 3/00* (2006.01)
*G06Q 10/02* (2012.01)
*G07F 17/00* (2006.01)

(52) U.S. Cl.
CPC ............ *H04L 63/08* (2013.01); *H04W 12/06* (2013.01); *B62H 3/00* (2013.01); *B62H 2003/005* (2013.01)

(58) Field of Classification Search
CPC .. B62H 3/00; B62H 2003/005; G07F 17/0057
USPC .......................................................... 705/13
See application file for complete search history.

(56) References Cited

U.S. PATENT DOCUMENTS

| | | | |
|---|---|---|---|
| 2013/0099892 A1* | 4/2013 | Tucker ................. | B60R 25/241 340/5.61 |
| 2013/0317693 A1* | 11/2013 | Jefferies ................ | G07B 15/00 701/31.5 |
| 2017/0123423 A1* | 5/2017 | Sako ........................ | G08G 1/00 |
| 2018/0201226 A1* | 7/2018 | Falkson ................ | B60R 25/257 |

* cited by examiner

FIG. 8

VEHICLE MANAGEMENT METHOD, SYSTEM AND SERVER, AND VEHICLE

CROSS-REFERENCE TO RELATED APPLICATION

This application claims the priority under 35 USC § 119 of Chinese patent application No. 201710313362.X, filed on May 5, 2017, the contents of which hereby is incorporated herein by reference, in its entirety, for all purposes.

FIELD

The present disclosure relates to vehicle management technologies, and more particularly to a vehicle management method, a vehicle management server, a manageable vehicle and a vehicle management system.

BACKGROUND

In recent years, "shared technology" becomes a term with a very high exposure rate. The core of the shared technology lies in a target of using idle and discrete offline resources rather than occupying them to maximize the utilization rate thereof and save cost. The shared technology represents a new technology direction in the current society which advocates environmental protection and resource saving.

As a typical example of the shared technology, shared bicycles grow at an explosive speed. The pick-up of the shared bicycles gradually evolves from a piled manner to a pile-free manner so that users can use bicycles whenever and wherever possible, which greatly facilitates use of the shared bicycles.

In a current shared bicycle system, before a user begins to use a bicycle, the bicycle is in a locked state. When using the bicycle, the user needs to scan a two-dimensional code on the bicycle through a cell phone or directly input a bicycle code so as to unlock the bicycle. In some shared bicycle systems, a user needs to manually input an unlocking password obtained from a server and toggle a lock tongue to unlock the bicycle. In such a system, a client device on the cell phone needs to report information of the vehicle to be used to the server and waits for the server to send the unlocking password. In addition, it is also possible to require the user to manually input a password. Therefore, the user needs to wait for a period of time before using the shared bicycle, which will bring bad use experience.

For example, the patent application No. 201510319473.2 discloses an improved shared bicycle system. In this bicycle system, a user scans a two-dimensional code stuck on a bicycle through a user device such as a cell phone to obtain ID information of the bicycle, and sends the ID information and user information to a backend server for authentication. In case of successful authentication, the backend server will send an unlocking command to an intelligent lock on the bicycle. After receiving the unlocking command, the intelligent lock automatically opens the physical lock, and the backend server starts to bill. The user starts to use the bicycle. When returning the bicycle, the user manually locks the intelligent lock, which perceives the locking action and informs the backend server that the bicycle is returned. Then the backend server performs billing.

However, in this shared bicycle system, the user can start to use the bicycle only after the authentication, which deteriorates the use experience. For example, if the cell phone network signal or vehicle lock GPRS signal is poor, due to delay of signal transmission, it is possible that the unlocking time is prolonged.

The above takes bicycles as an example to indicate problems existing in the shared bicycle technology. The shared technology may be further applied to automobiles, motorcycles, electric vehicles and the like. Similar problems exist in the shared technology for these vehicles.

Therefore, there is a need to provide a new technical solution to solve at least one of the technical problems in the prior art.

SUMMARY

One object of this disclosure is to provide a new technical solution for vehicle management.

According to a first aspect of the present disclosure, there is provided a vehicle management method, which comprises: acquiring by a client device a vehicle identification of an available vehicle; receiving by a vehicle management server an authentication request from the client device, the authentication request including the vehicle identification and a user identification of the client device; authenticating by the vehicle management server the vehicle identification and the user identification to permit a continuously available state of the vehicle; sending by the vehicle management server a use permission of the continuously available state to the vehicle; and receiving by the vehicle the use permission to continue its available state.

Alternatively or optionally, the method further comprises: if the authentication fails, sending by the vehicle management server a stop command for stopping the available state to the vehicle; and receiving by the vehicle the stop command to stop its available state.

Alternatively or optionally, the method further comprises: when the vehicle receives the stop command, providing a stop prompt about stopping the available state for the user through at least one of a vibration means and a sound generating means in the vehicle.

Alternatively or optionally, the method further comprises: after the vehicle receives the stop command for a first predetermined period, stopping the available state of the vehicle.

Alternatively or optionally, the method further comprises: if the authentication fails, sending by the vehicle management server a re-authentication message for re-authentication to the client device.

Alternatively or optionally, the method further comprises: receiving by the client device the re-authentication message; and providing a prompt about re-authentication for the user through at least one of a sound, a vibration and a screen message display.

Alternatively or optionally, the method further comprises: determining by the vehicle its riding state; and if the use permission is not received within a second predetermined period after the riding state starts, stopping by the vehicle its available state.

Alternatively or optionally, the method further comprises: if the use permission is not received within a third predetermined period after the riding state starts, providing a stop prompt about stopping the available state for the user through at least one of a vibration means and a sound generating means in the vehicle, the third predetermined period being less than the second predetermined period.

Alternatively or optionally, when the available state of the vehicle is stopped, if a duration of the non-riding state of the vehicle is longer than a fourth predetermined period, the vehicle activates the available state.

Alternatively or optionally, the vehicle determines its riding state by detecting at least one of a vehicle seat pressure and a wheel rotation state.

Alternatively or optionally, the available state of the vehicle is stopped by the vehicle by activating at least one of a vehicle lock and a vehicle braking means.

Alternatively or optionally, the client device acquires the vehicle identification through at least one of a two-dimensional code input or a character input, a Bluetooth connection and a Near Field Communication.

According to the second aspect of the present disclosure, there is provided a vehicle management server, which comprises: a memory and a processing means, wherein the memory stores executable instructions, and when the vehicle management server operates, the executable instructions control the processing means to perform the following operations of: receiving an authentication request from a client device, the authentication request including a vehicle identification of an available vehicle and a user identification of the client device; authenticating the vehicle identification and the user identification to permit a continuously available state of the vehicle; and sending a use permission of the continuously available state to the vehicle to continue the available state of the vehicle.

Alternatively or optionally, the executable instructions control the processing means to perform the following operation of: if the authentication fails, sending a stop command for stopping the available state to the vehicle.

Alternatively or optionally, the executable instructions control the processing means to perform the following operation of: if the authentication fails, sending a re-authentication message for re-authentication to the client device.

According to the third aspect of the present disclosure, there is provided a manageable vehicle, which comprises a control means configured for: providing a client device with a vehicle identification when the vehicle is in an available state; receiving a use permission of a continuously available state of the vehicle from a vehicle management server; and continuing the available state based on the use permission.

Alternatively or optionally, the vehicle further comprises a stopping means for stopping the available state of the vehicle, wherein the control means is further configured to perform the following operations of: if the authentication fails, receiving a stop command from the vehicle management server for stopping the available state; and controlling the stopping means to stop the available state of the vehicle.

Alternatively or optionally, the vehicle further comprises at least one of a vibration means and a sound generating means, wherein the control means is further configured to perform the following operation of: when receiving the stop command, controlling at least one of the vibration means and the sound generating means to provide a stop prompt about stopping the available state for a user.

Alternatively or optionally, the control means is further configured to perform the following operation of: after receiving the stop command for a first predetermined period, controlling the stopping means to stop the available state of the vehicle.

Alternatively or optionally, the vehicle further comprises a stopping means for stopping the available state of the vehicle, wherein the control means is further configured to perform the following operations of: determining a riding state of the vehicle; and if the use permission is not received within a second predetermined period after the riding state starts, controlling the stopping means to stop the available state of the vehicle.

Alternatively or optionally, the vehicle further comprises at least one of a vibration means and a/the sound generating means, wherein the control means is further configured to perform the following operation of: if the use permission is not received within a third predetermined period after the riding state starts, controlling at least one of the vibration means and the sound generating means to provide a/the stop prompt about stopping the available state for the user, the third predetermined period being less than the second predetermined period.

Alternatively or optionally, the control means is further configured to perform the following operation of: when the available state of the vehicle is stopped, if a duration of the non-riding state of the vehicle is longer than a fourth predetermined period, controlling the stopping means to activate the available state of the vehicle.

Alternatively or optionally, the vehicle further comprises a sensing means configured to determine if the vehicle is in the riding state by detecting at least one of a vehicle seat pressure and a wheel rotation state.

Alternatively or optionally, the stopping means is at least one of a vehicle lock and a vehicle braking means.

Alternatively or optionally, the control means is further configured to provide the vehicle identification through at least one of a two-dimensional code or a character, a Bluetooth connection and a Near Field Communication.

According to the fourth aspect of the present disclosure, there is provided a vehicle management system, which comprises the vehicle management server according to the embodiments of the present disclosure, and the vehicle and the client device according to the embodiments of the present disclosure, wherein the vehicle management server, the vehicle and the client device are respectively configured to perform the method according to the embodiments of the present disclosure.

According to one embodiment of the present disclosure, the user experience can be improved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

DETAILED DESCRIPTION OF THE EMBODIMENTS

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the disclosure, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

<Methods>

Figure 1:
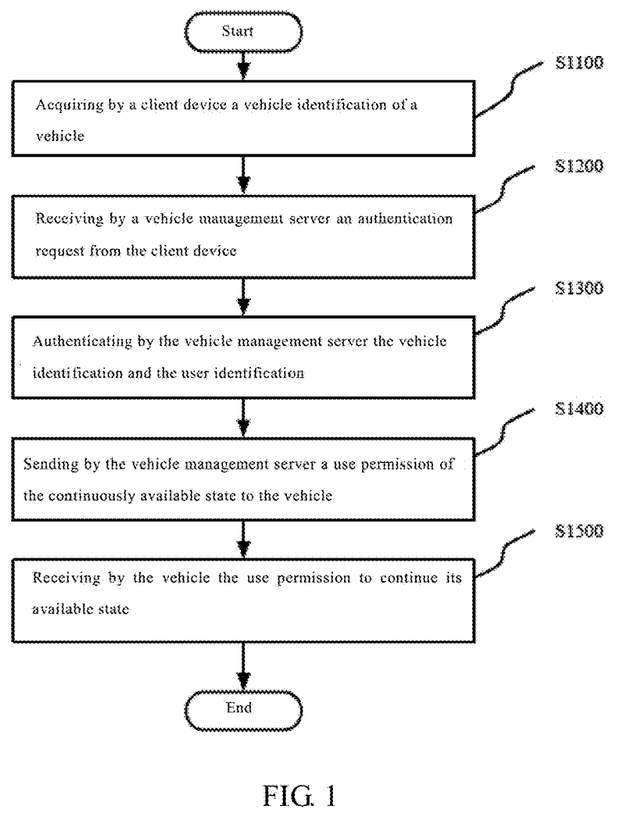
FIG. 1 is a schematic flow chart of the method according to an embodiment of the present disclosure.

FIG. 1 is a schematic flow chart of the method according to an embodiment of the present disclosure.

As shown in FIG. 1, in step S1100, a client device acquires a vehicle identification of an available vehicle. The vehicle identification may be used to identify the vehicle to be used by a user. The vehicle identification may be a unique identification of all vehicles, and also may be a unique identification within a certain area. Here, a vehicle may be a bicycle, an electric vehicle, a motorcycle, an automobile and the like.

When the user acquires the vehicle identification through a client, the vehicle is in an available state. Before or after the user acquires the vehicle identification through the client device, the user can directly use the vehicle instead of waiting for the completion of the vehicle authentication.

For example, the client device acquires the vehicle authentication through at least one of a two-dimensional code or character input, a Bluetooth connection and Near Field Communication. The user can scan the two dimensional code on the vehicle, manually input the character on the vehicle, and the character may include letters, words, digits and the like. In addition, the user may use the Bluetooth connection or the Near Field Communication to establish connection between the client device and the vehicle and obtain the vehicle identification of the vehicle.

In step S1200, a vehicle management server receives an authentication request from the client device, wherein the authentication request includes the vehicle identification and a user identification of the client device. The client device may be an application installed on a terminal device of the user, such as a cell phone, and also may be a separate device.

In step S1300, the vehicle management server authenticates the vehicle identification and the user identification to permit a continuously available state of the vehicle. During authentication, if the user can use the vehicle is checked through the vehicle identification and the user identification. For instance, if the use has overdue bills, credit of the user, a state of the vehicle and the like are checked.

In step S1400, the vehicle management server sends a use permission of the continuously available state to the vehicle. After the authentication, the vehicle server permits the user to use the vehicle and sends the use permission to the vehicle.

In step S1500, the vehicle receives the use permission to continue its available state.

Before the vehicle receives the use permission, the user has been able to use the vehicle. Compared with the prior art, the user can use the shared vehicle more conveniently or rapidly through the present embodiment.

In addition, in certain cases, the vehicle server may not permit the user to use the shared vehicle. For example, the cases include: the user has bad credit; the user has overdue bills; the vehicle is damaged and is not suitable for use and the like. In these conditions, the vehicle server may determine the authentication fails. If the authentication fails, the vehicle management server sends a stop command for stopping the available state to the vehicle. The vehicle receives the stop command to stop its available state.

In one example, in order to alleviate bad experience of the user caused by sudden stop of the available state of the vehicle, if the vehicle receives the stop command, a stop prompt about stopping the available state to the user is provided through at least one of a vibration means and a sound generating means in the vehicle. For example, the vibration means is installed on a handlebar and may provide a vibration prompt for the user. For example, the sound generating means may be a buzzer.

After the user receives the prompt, the vehicle may be exchanged, or an authentication request may be re-sent after recharging, etc. For example, after the vehicle receives the stop command for a first predetermined period, the user can stop the available state of the vehicle. For example, the first predetermined period is five minutes. In this way, the user has sufficient time to perform other operations after receiving the prompt.

In addition, in a case where the authentication fails, the vehicle management server directly sends a re-authentication message for re-authentication to the client device. The client device receives the re-authentication message and provides a prompt about re-authentication for the user through at least one of a sound, a vibration and a screen message display. After receiving the prompt, the user may perform recharging etc. and re-send an authentication request. The vehicle management server receives the re-sent authentication request and re-performs an authentication. When the re-performed authentication succeeds, the vehicle management server may send a use permission to the vehicle and the user can continue using the vehicle.

A vehicle is in an available state when not ridden by a user, which facilitates usage of the user and improves the user experience. However, it is possible that a user uses a vehicle without being permitted. In order to prevent such a case, the riding state may be determined by the vehicle. If the use permission is not received within a second predetermined period after the riding state starts, the available state of the vehicle may be stopped. For example, the second predetermined period is five minutes. In addition, in a case where the user fails in the authentication for a long period of time, the available state of the vehicle also may be stopped through this manner.

Here, in order to alleviate bad experience of the user caused by sudden stop of the available state of the vehicle, a prompt that the user has not been permitted may be provided. For example, if the use permission is not received within a third predetermined period after the riding state starts, at least one of the vibration means and the sound generating means provides a/the stop prompt about stopping the available state for the user, the third predetermined period being less than the second predetermined period. For example, the third predetermined period is four minutes.

After the available state of the vehicle is stopped, the available state of the vehicle may be automatically restored. For example, when the available state of the vehicle is stopped, if a duration of the non-riding state of the vehicle is longer than a fourth predetermined period, the vehicle activates the available state. For example, the fourth predetermined period is ten minutes.

Here, the vehicle determines the riding state by detecting at least one of a vehicle seat pressure and a wheel rotation state.

For example, when a user completes the user of a vehicle, the user may manually terminate the use of the vehicle through a client device. In addition, it may be determined that the user terminates the use of the vehicle by detecting that the vehicle is in a non-riding state. The present disclosure does not focus on this. Therefore, the case where the use of the vehicle is terminated will not be described in detail here.

Here, the vehicle can stop the available state of the vehicle by starting at least one of a vehicle lock and a vehicle braking means.

In this embodiment, the vehicle is in an available state before being used. The user can complete the authentication after use, which can improve the user experience.

In addition, here, when the authentication fails, the influence on the user caused by stop of the available state can be alleviated.

In addition, here, when the user is not permitted to use the vehicle, the user may be stopped from continuously using the vehicle.

<Vehicle Management Server>

Figure 2:
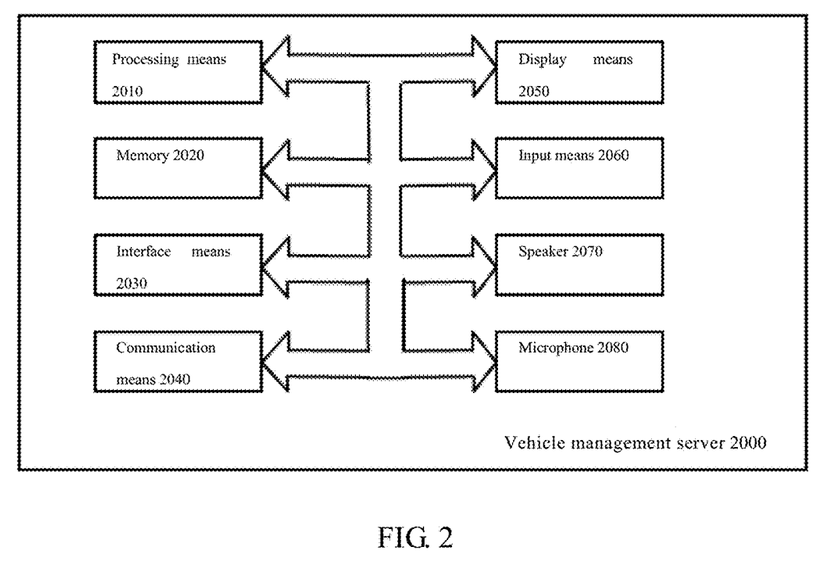
FIG. 2 is a schematic block diagram of the vehicle management server according to an embodiment of the present disclosure.

FIG. 2 is a schematic block diagram of the vehicle management server according to an embodiment of the present disclosure.

As shown in FIG. 2, the server 2000 may include a processing means 2010, a memory 2020, an interface means 2030, a communication means 2040, a display means 2050, an input means 2060, a speaker 2070, a microphone 2080 and the like.

The processing means 2010 may be a central processing unit CPU, a micro central processing unit MCU or the like, for example. The memory 2020 may include a ROM, a RAM, a non-volatile memory such as a hard disk, and the like, for example. The interface means 2030 may include a USB interface, a headphone interface and the like, for example.

For example, the communication means 2040 can perform wired or wireless communication.

For example, the display means 2050 may be a liquid crystal screen, a touch display screen or the like. The input means 2060 may include a touch screen, a keyboard and the like. The user can input/output voice information via the speaker 2070 and the microphone 2080.

The server shown in FIG. 2 is only illustrative, and is not intended to limit the present disclosure, or its application or use.

In this embodiment, the memory 2020 is used to store executable instructions. When the vehicle management server operates, the executable instructions control the processing means 2010 to perform the operations performed by the vehicle management server in the vehicle management method described with reference to FIG. 1 as above. Those skilled in the art should understand that although multiple means are shown in FIG. 2, the present disclosure in specific aspects thereof may only relate to some of them, such as the processing means 2010 and the memory 2020. Those skilled in the art can design the instructions according to the solutions disclosed by the present disclosure. How the instructions control the processing means to operate belongs to the common sense in the art and will not be described in detail.

For example, when the vehicle management server operates, the executable instructions control the processing means to perform the following operations of: receiving an authentication request from a client device, the authentication request including a vehicle identification of an available vehicle and a user identification of the client device; authenticating the vehicle identification and the user identification to permit a continuously available state of the vehicle; and sending a use permission of the continuously available state to the vehicle to continue the available state of the vehicle.

For example, the executable instructions control the processing means to perform the following operation of: if the authentication fails, sending a stop command for stopping the available state to the vehicle.

For example, the executable instructions control the processing means to perform the following operation of: if the authentication fails, sending a re-authentication message for re-authentication to the client device.

<Vehicle>

Figure 3:
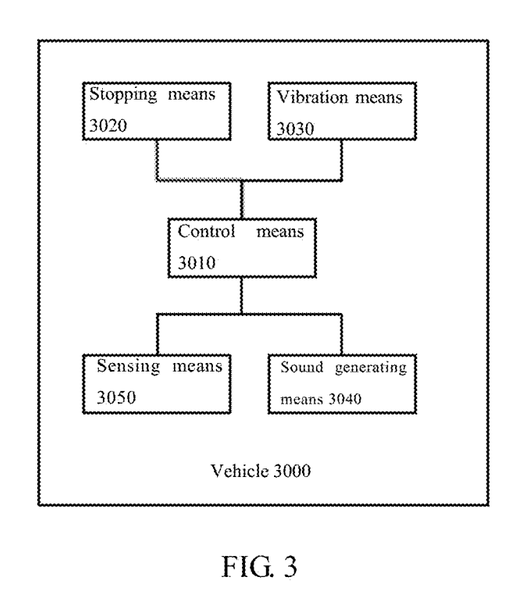
FIG. 3 is a schematic block diagram of the vehicle management system according to an embodiment of the present disclosure.

FIG. 3 is a schematic block diagram of the vehicle management system according to an embodiment of the present disclosure. The vehicle can perform the operations performed by the vehicle in the vehicle management method described with reference to FIG. 1 as above.

As shown in FIG. 3, the manageable vehicle 3000 includes a control means 3010 configured for: providing a client device with a vehicle identification when the vehicle is in an available state; receiving a use permission of a continuously available state of the vehicle from a vehicle management server; and continuing the available state based on the use permission.

For example, the control means 3010 is further configured to provide the vehicle identification through at least one of a two-dimensional code, a character, a Bluetooth connection and Near Field Communication. Here, the control means 3010 may include an electronic or non-electronic member. For example, the two-dimensional code and/or character printed on the vehicle body may serve as a member of the control means.

As shown in FIG. 3, the vehicle 3000 further includes a stopping means 3020 for stopping the available state of the vehicle. For example, the stopping means 3020 is at least one of a vehicle lock and a vehicle braking means. The control means is further configured to perform the following operations of: if the authentication fails, receiving a stop command for stopping the available state from the vehicle management server; and controlling the stopping means to stop the available state of the vehicle.

As shown in FIG. 3, the vehicle 3000 may further include at least one of a vibration means 3030 and a sound generating means 3040. The control means 3010 is further configured to perform the following operation of: when receiving the stop command, controlling at least one of the vibration means 3030 and the sound generating means 3040 to provide a stop prompt about stopping the available state for a user. For example, the control means 3010 is further configured to perform the following operation of: after receiving the stop command for a first predetermined period, controlling the stopping means 3020 to stop the available state of the vehicle.

In an example, the control means 3010 is further configured to perform the following operations of: determining a riding state of the vehicle; and if the use permission is not received within a second predetermined period after the riding state starts, controlling the stopping means 3020 to stop the available state of the vehicle. For example, the control means 3010 is further configured to perform the following operation of: if the use permission is not received within a third predetermined period after the riding state starts, controlling at least one of the vibration means 3030 and the sound generating means 3040 to provide a/the stop prompt about stopping the available state for the user, the third predetermined period being less than the second predetermined period.

In addition, the control means 3010 is further configured to perform the following operation of: when the available state of the vehicle is stopped, if a duration of the non-riding state of the vehicle is longer than a fourth predetermined period, controlling the stopping means 3020 to activate the available state of the vehicle.

As shown in FIG. 3, the vehicle 3000 further includes a sensing means 3050 configured to determine if the vehicle is in the riding state by detecting at least one of a vehicle seat pressure and a wheel rotation state. The control means 3010 may acquire the riding state of the vehicle from the sensing means 3050.

Those skilled in the art shall well know that, as electronic and information technologies such as large scale integrated circuit technologies develop and the trend that software are realized by hardware advances, it becomes difficult to distinguish software and hardware of computer systems, since any operation or execution of any instruction may be realized by software or hardware. Whether to realize a function of a machine using a software or hardware solution may depend on non-technical factors such as prices, speeds, reliability, storage capacity, change period etc. For those skilled in the art, realization by software and by hardware is equivalent. Those skilled in the art can select software or hardware to realize the above solutions. Therefore, the specific software or hardware will not be defined here.

Figure 4:
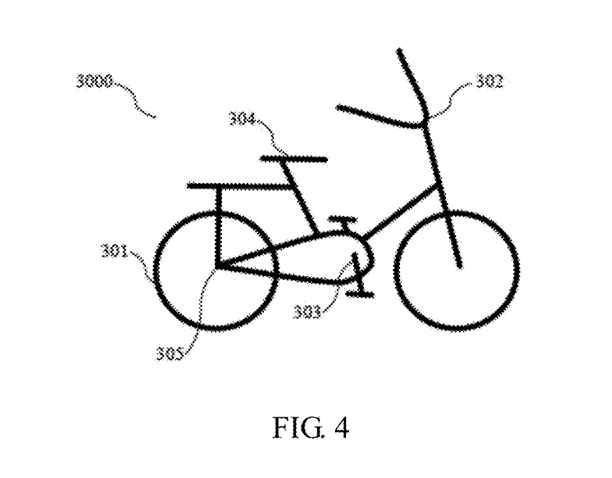
FIG. 4 is a schematic diagram of the vehicle according to an embodiment of the present disclosure.

FIG. 4 is a schematic view of the vehicle according to an embodiment of the present disclosure. FIG. 4 shows a bicycle. However, those skilled in the art should understand that the vehicle 3000 may be other vehicles such as an electric vehicle, a motor cycle, an automobile or the like.

As shown in FIG. 4, for example, the bicycle 3000 includes wheels 301, a handlebar 302, pedals 303, a seat 304 and a shaft 305. The various means in the vehicle shown in FIG. 3 may be arranged in the bicycle in FIG. 4. For example, the control means 3010 may be arranged on the handlebar 302. The stopping means 3020 may be arranged on the wheel 301 or the shaft 305. The vibration means 3030 and/or the sound generating means 3040 may be arranged on the handlebar 302. The sensing means may be arranged on the seat 304 or the wheel 301.

The vehicle shown in FIG. 4 is only exemplary and shall not limit the present disclosure.

<Vehicle Management System>

Figure 5:
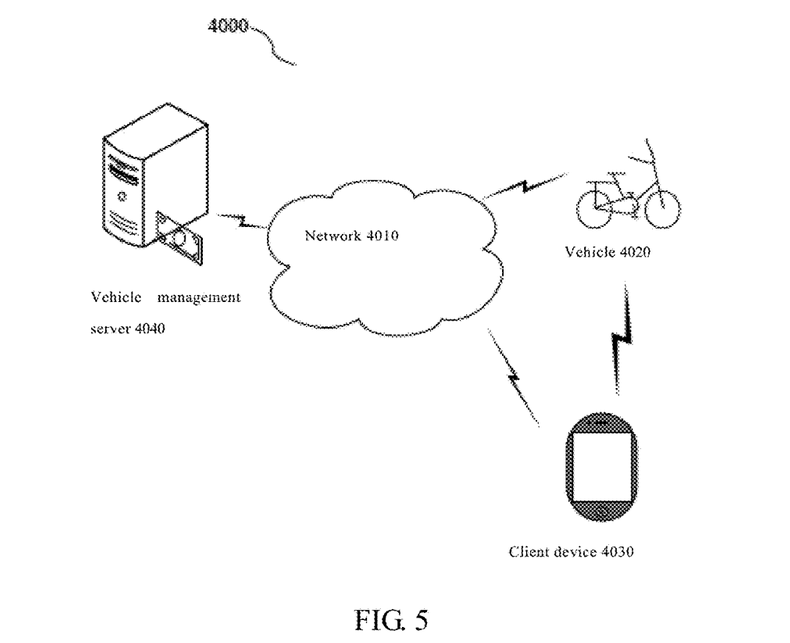
FIG. 5 is a schematic block diagram of the vehicle management system according to another embodiment of the present disclosure.

FIG. 5 is a schematic block diagram of the vehicle management system according to another embodiment of the present disclosure.

As shown in FIG. 5, the vehicle management system 4000 may include the vehicle management server 4040 according to the above embodiment, the manageable vehicle 4020 and the client device 4030 according to the above embodiment. For example, the vehicle 4020 and the client device 4030 may communicate with the vehicle management server 4040 via the network 4010. The manageable vehicle 4020 and the client device 4030 may communicate through Bluetooth or Near Field Communication manners. For example, the client device 4030 may be installed in a terminal device such as a cell phone, or may be a separate device. The vehicle management server 4040, the vehicle 4020 and the client device 4030 are configured to perform the methods according to the above embodiments respectively.

The vehicle 4020 includes a two-dimensional code and/or a code for uniquely identifying a corresponding vehicle.

The user may scan the 2D code on the vehicle 4020 via the client device 4030 and send the 2D code information to the vehicle management server 4040 for performing unlocking operations.

The user may input or recognize the code of the vehicle 4020 via the client device 4030 and send the code information to the vehicle management server 4040 for performing unlocking operations.

When the user scans the two-dimensional code of the vehicle 4020 or input the code thereof via the client device 4030, the user needs to use a function of the client device 4030, such as a flashlight function or a camera function of the client device 4030.

In the present disclosure, the client device 4030 may send or receive signals via a wired or wireless network for example, or may process the signals in a memory for example, or store the signals in a physical storage state. Each client device may be an electronic device including hardware, software or an inbuilt logic assembly or two or more of such assemblies used to execute suitable functions supported by the mobile terminal. For example, the client device may be a smart cell phone, a tablet computer, a portable email device, an electronic book, a handheld gaming machine and/or game controller, a notebook computer, an Internet surfing computer, a handheld electronic device, a smart wearable device or the like. The present disclosure covers any suitable client device. The client device may enable its user to access a network.

The client device 4030 may include a processing device including an application processing part and a radio frequency/digital signal processor, and may include a memory device including a ROM, a RAM, a flash memory or any combination thereof.

In addition, various client applications may be installed in the client device 4030 to allow the client device 4030 to transmit commands suitable for operations with other devices. Such applications may be downloaded from a server and may be installed in the memory of or pre-installed in the client device 4030. In the present disclosure, the client device 4030 is installed with a vehicle client terminal application that can help the user use the functions of the vehicle 4020.

In the present disclosure, the vehicle management server 4040 is a server. The server in this description should be understood as a service point providing processing, database and communication facilities. For example, the server may be a single physical processor including related communication, data storage and database facilities, or a networked or clustered processor, or a cluster of related networks and storage devices, and can operate software, one or more database and application software providing services supported by the server. The servers may vary greatly in configuration or performance, but generally the server may include one or more central processing units and memories. The server further include one or more large-volume storage devices, one or more power sources, one or more wired or wireless network interfaces, one or more input/output interfaces, one or more operating systems such as Windows Server, Mac OS X, Unix, Linux and FreeBSD, and the like. Specifically, the vehicle management server 4040 may be an integral server or a distributed server across multiple computers or computer data centers. The server may include various servers, such as but not limited to a network server, a news server, a mail server, a message server, an advertisement server, a file server, an application server, an interactive server, a database server or a proxy server. In some embodiments, each server may include hardware, software or an inbuilt logic assembly or two or more of such assemblies used to execute suitable functions supported by the server. In the present disclosure, the vehicle management server 4040 is used to provide all functions required for using the vehicle.

In the present disclosure, the vehicle 4020 may be a bicycle, a tricycle, an electric scooter, a motor cycle, a four-wheeled vehicle or the like.

In the present disclosure, the wireless network 4010 covers any suitable wireless network, such as but not limited to a 4G network, a 3G network, a GPRS network, a Wi-Fi network or the like. In addition, the wireless network coupling the vehicle management server 4040 and the client device 4030 and the vehicle management server 4040 and the vehicle 4000 may be the same or different.

EXAMPLES

Figure 6:
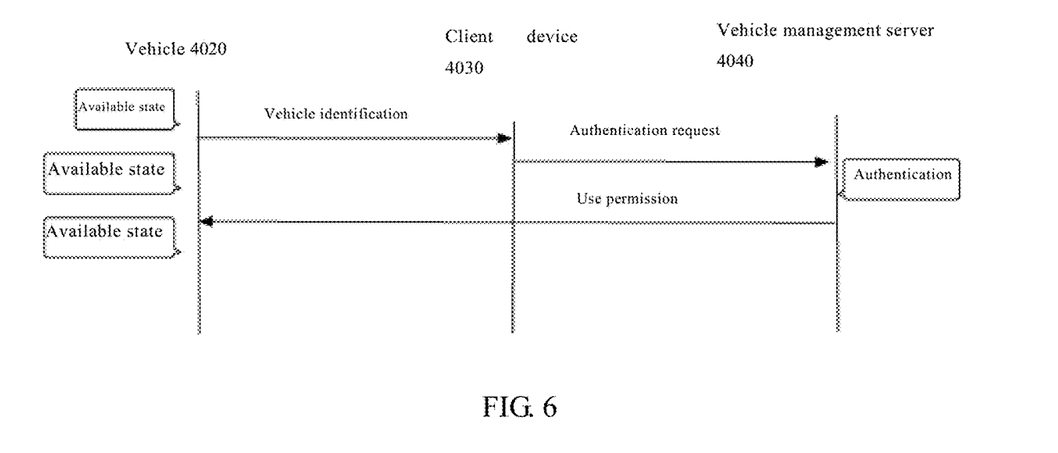
FIG. 6 is a schematic flow chart of an example of the present disclosure.
Figure 7:
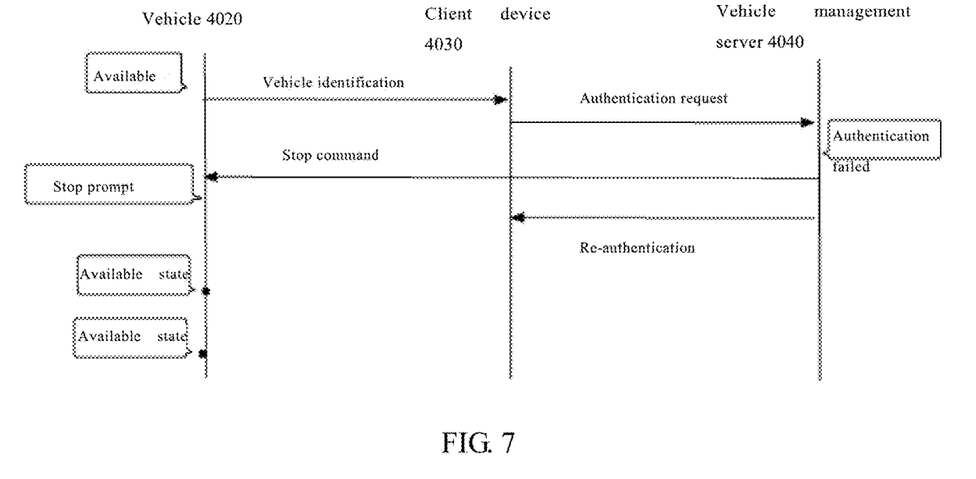
FIG. 7 is a schematic flow chart of another example of the present disclosure.
Figure 8:
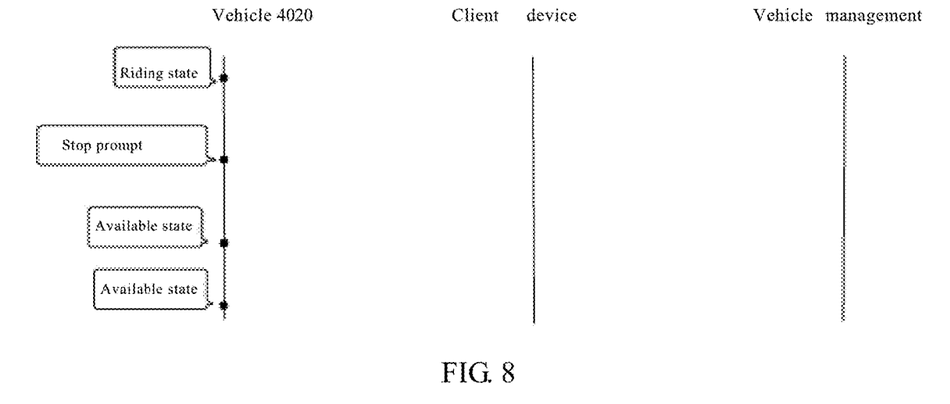
FIG. 8 is a schematic flow chart of yet another example of the present disclosure.

FIGS. 6-8 are schematic flow charts of examples of the present disclosure. The following FIGS. 7-9 are referred to illustrate the examples of the above embodiment.

FIG. 6 shows a case where a user uses a shared bicycle normally.

As shown in FIG. 6, a vehicle 4020 is in an available state before a user uses the vehicle. The user starts to use the vehicle and performs an authentication application when in convenience (e.g., when waiting before a red light). The user uses a client device 4030 to acquire vehicle identification. For example, the user can use the client device 4030 to scan a two-dimensional code and/or character on the vehicle and can input characters such as digits, letters etc. in the client device 4030. In addition, the user can also establish connection between the client device 4030 and the vehicle 4020 through a Bluetooth or a Near Field Communication so as to acquire the vehicle identification.

Next, the client device 4030 sends an authentication request to a vehicle management server 4040. The authentication request comprises a vehicle identification and a user identification of the client device.

The vehicle management server 4040 performs authentication based on the vehicle identification and the user identification.

When the authentication succeeds, the vehicle management server 4040 sends a use authentication to the vehicle 4020 to permit the vehicle to continue the available state.

Here, before the user performs authentication and after the vehicle receives the use authentication, the vehicle keeps its available state. Therefore, use experience of the user is improved.

FIG. 7 shows a case where an authentication fails.

As shown in FIG. 7, a vehicle 4020 is in an available state before a user uses a vehicle. A client device 4030 acquires a vehicle identification from a vehicle 4020 and sends an authentication request to a vehicle management server 4040. The authentication request may comprise a vehicle identification and a user identification of the user.

The vehicle management server 4040 authenticates based on the vehicle identification and the user identification. Due to reasons such as overdue bills of the user, the authentication fails. The vehicle management server 4040 sends a stop command to the vehicle 4020 to stop the available state of the vehicle.

After the vehicle 4020 receives the stop command, the vehicle provides a stop prompt about stopping the available state for the user through at least one of a vibration means and a sound generating means in the vehicle. At this moment, the user may perform re-authentication to continuously use the vehicle.

If the user does not perform re-authentication, the vehicle 4020 stops the available state of the vehicle after five minutes (a first predetermined time) after receiving the stop command. For example, activating at least one of a vehicle lock and a vehicle braking means stops the available state of the vehicle.

In addition, in a case where an authentication fails, the vehicle management server 4040 may send a re-authentication message to the client device 4030 to remind the user to perform re-authentication.

When the vehicle 4020 stops the available state and is in a non-riding state, the available state of the vehicle 4020 may be automatically restored. For example, when the time period for which the vehicle 4020 is in a non-riding state reaches ten minutes (a fourth predetermined time), it can be believed that the current user has left the vehicle and can re-start the available state of the vehicle.

FIG. 8 shows a case where the user uses the vehicle without permission.

As shown in FIG. 8, the user uses the vehicle 4020 without permission, and does not authenticate to the vehicle management server 4040 through the client device 4030. The vehicle 4020 detects that the vehicle is in a riding state through a sensing device and starts to time.

For example, when the riding state keeps for four minutes (a third predetermined time), the vehicle 4020 provides a stop prompt for the user through a vibration means or a sound generating means to remind the user that the vehicle will be stopped and the user needs to perform authentication.

When the riding state keeps for five minutes (a second predetermined time), the vehicle 4020 determines that the user is not permitted to use the vehicle. At this moment, the vehicle 4020 can stop the available state.

For example, when the vehicle 4020 keeps a non-riding state for ten minutes (a fourth predetermined time), it can be believed that the current user has left the vehicle and can restart the available state of the vehicle.

The present disclosure may be summarized as below.

EEEE 1. A vehicle management method, comprises: acquiring by a client device a vehicle identification of an available vehicle; receiving by a vehicle management server an authentication request from the client device, the authentication request including the vehicle identification and a user identification of the client device; authenticating by the vehicle management server the vehicle identification and the user identification to permit a continuously available state of the vehicle; sending by the vehicle management server a use permission of the continuously available state to the vehicle; and receiving by the vehicle the use permission to continue its available state.

EEEE 2. The method of EEEE 1 further comprises: if the authentication fails, sending by the vehicle management server a stop command for stopping the available state to the vehicle; and receiving by the vehicle the stop command to stop its available state.

EEEE 3. The method of EEEE 2 further comprises: when the vehicle receives the stop command, providing a stop prompt about stopping the available state for the user through at least one of a vibration means and a sound generating means in the vehicle.

EEEE 4. In the method of EEEE 2, after the vehicle receives the stop command for a first predetermined period, the available state of the vehicle is stopped.

EEEE 5. The method of EEEE 2 further comprises: if the authentication fails, sending by the vehicle management server a re-authentication message for re-authentication to the client device.

EEEE 6. The method of EEEE 5 further comprises: receiving by the client device the re-authentication message; and providing a prompt about re-authentication for the user through at least one of a sound, a vibration and a screen message display.

EEEE 7. The method of EEEE 1 further comprises: determining by the vehicle its riding state; and if the use permission is not received within a second predetermined period after the riding state starts, stopping by the vehicle its available state.

EEEE 8. The method of EEEE 7 further comprises: if the use permission is not received within a third predetermined period after the riding state starts, providing a stop prompt about stopping the available state for the user through at least one of a vibration means and a sound generating means in the vehicle, the third predetermined period being less than the second predetermined period.

EEEE 9. In the method of EEEE 2 or 7, when the available state of the vehicle is stopped, if a duration of the non-riding state of the vehicle is longer than a fourth predetermined period, the vehicle activates the available state.

EEEE 10. In the method of EEEE 7 or 9, the vehicle determines its riding state by detecting at least one of a vehicle seat pressure and a wheel rotation state.

EEEE 11. In the method of EEEE 2 or 7, the available state of the vehicle is stopped by the vehicle by activating at least one of a vehicle lock and a vehicle braking means.

EEEE 12. In the method of EEEE 1, the client device acquires the vehicle identification through at least one of a two-dimensional code input or a character input, a Bluetooth connection and a Near Field Communication.

EEEE 13. A vehicle management server comprises: a memory and a processing means, wherein the memory stores executable instructions, and when the vehicle management server operates, the executable instructions control the processing means to perform the following operations of: receiving an authentication request from a client device, the authentication request including a vehicle identification of an available vehicle and a user identification of the client device; authenticating the vehicle identification and the user identification to permit a continuously available state of the vehicle; and sending a use permission of the continuously available state to the vehicle to continue the available state of the vehicle.

EEEE 14. In the vehicle management server of EEEE 13, the executable instructions control the processing means to perform the following operation of: if the authentication fails, sending a stop command for stopping the available state to the vehicle.

EEEE 15. In the vehicle management server of EEEE 14, the executable instructions control the processing means to perform the following operation of: if the authentication fails, sending a re-authentication message for re-authentication to the client device.

EEEE 16. A manageable vehicle comprises a control means configured for: providing a client device with a vehicle identification when the vehicle is in an available state; receiving a use permission of a continuously available state of the vehicle from a vehicle management server; and continuing the available state based on the use permission.

EEEE 17. The vehicle of EEEE 16 further comprises a stopping means for stopping the available state of the vehicle, wherein the control means is further configured to perform the following operations of: if the authentication fails, receiving a stop command for stopping the available state from the vehicle management server; and controlling the stopping means to stop the available state of the vehicle.

EEEE 18. The vehicle of EEEE 17 further comprises at least one of a vibration means and a sound generating means, wherein the control means is further configured to perform the following operation of: when receiving the stop command, controlling at least one of the vibration means and the sound generating means to provide a stop prompt about stopping the available state for a user.

EEEE 19. In the vehicle management server of EEEE 17, the control means is further configured to perform the following operation of: after receiving the stop command for a first predetermined period, controlling the stopping means to stop the available state of the vehicle.

EEEE 20. The vehicle of EEEE 16 further comprises a/the stopping means for stopping the available state of the vehicle, wherein the control means is further configured to perform the following operations of: determining a riding state of the vehicle; and if the use permission is not received within a second predetermined period after the riding state starts, controlling the stopping means to stop the available state of the vehicle.

EEEE 21. The vehicle of EEEE 20 further comprises at least one of a/the vibration means and a/the sound generating means, wherein the control means is further configured to perform the following operation of: if the use permission is not received within a third predetermined period after the riding state starts, controlling at least one of the vibration means and the sound generating means to provide a/the stop prompt about stopping the available state for the user, the third predetermined period being less than the second predetermined period.

EEEE 22. In the vehicle of EEEE 17 or 20, the control means is further configured to perform the following operation of: when the available state of the vehicle is stopped, if a duration of the non-riding state of the vehicle is longer than a fourth predetermined period, controlling the stopping means to activate the available state of the vehicle.

EEEE 23. The vehicle of EEEE 20 or 22 further comprises a sensing means configured to determine if the vehicle is in the riding state by detecting at least one of a vehicle seat pressure and a wheel rotation state.

EEEE 24. In the vehicle of EEEE 17 or 20, the stopping means is at least one of a vehicle lock and a vehicle braking means.

EEEE 25. In the vehicle of EEEE 16, the control means is further configured to provide the vehicle identification through at least one of a two-dimensional code or a character, a Bluetooth connection and Near Field Communication.

EEEE 26. A vehicle management system comprises the vehicle management server of EEEE 13, and the vehicle of EEEE 16 and the client device, wherein the vehicle management server, the vehicle and the client device are respectively configured to perform the method of any of EEEEs 1-12.

The present disclosure in various aspects thereof may relate to a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scene, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

It should be noted that the respective embodiments of the present description are described in a progressive manner, the focus of each embodiment illustrates the differences from other embodiments, and the same or similar parts among the embodiments may refer to one another. However, those skilled in the art should understand that the above embodiments may be used individually or in combination according to the needs. In addition, as the device embodiments correspond to the method embodiments, the description of the former is relatively simpler, and the related parts may refer to the corresponding parts of the method embodiments. The above-described device embodiments are only illustrative. The modules or units in these devices described may be or not physically separated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the attached claims is intended to be interpreted and construed in accordance with the disclosure herein, and to encompass all variations, modifications, and alternative embodiments that will readily suggest themselves to those of ordinary skill in the art, based on the disclosure herein.

Although some specific embodiments of the present disclosure have been demonstrated in detail with examples, it should be understood by a person skilled in the art that the above examples are only intended to be illustrative but not to limit the scope of the present disclosure.

What is claimed is:

1. A manageable vehicle comprising a processor configured for:
   providing a client device with a vehicle identification when the vehicle is in an available state;
   receiving a use permission for authenticating a continuously available state of the vehicle from a vehicle management server; and
   continuing the available state based on the use permission;
   the vehicle further comprising:
   a stopping component for stopping the available state of the vehicle, wherein the processor is further configured to perform the following operations of:
   if the authenticating fails, receiving a stop command from the vehicle management server for stopping the available state of the vehicle, and controlling the stopping component to stop the available state of the vehicle after a first predetermined period;
   if a state of the vehicle is determined as a riding state controlling the stopping component to stop the available state of the vehicle if the use permission is not received within a second predetermined period after the riding state starts;
   the vehicle further comprising: at least one of a vibration component and a sound generating component, wherein the processor is further configured to perform the following operation of:
   if the use permission is not received within a third predetermined period after the riding state starts, controlling at least one of the vibration component and the sound generating component to provide a stop prompt about stopping the available state for the user, the third predetermined period being less than the second predetermined period.

2. The vehicle of claim 1, wherein the processor is further configured to perform the following operation of:
   when the available state of the vehicle is stopped and is in a non-riding state, and if a duration of the non-riding state of the vehicle is longer than a fourth predetermined period, controlling the stopping component to activate the available state of the vehicle.

3. The vehicle of claim 1, further comprising a sensing component configured to determine if the vehicle is in the riding state by detecting at least one of a vehicle seat pressure and a wheel rotation state.

4. The vehicle of claim 1, wherein the stopping component is at least one of a vehicle lock and a vehicle braking component.

5. The vehicle of claim 1, wherein the processor is further configured to provide the vehicle identification through at least one of a two-dimensional code or a character, a Bluetooth connection and Near Field Communication.

6. A vehicle management system comprising:
   a vehicle management server, a vehicle and a client device, wherein the vehicle management server, the vehicle and the client device are respectively configured to perform a vehicle management method, comprising:
   acquiring by the client device a vehicle identification of the vehicle when the vehicle is available;
   receiving by the vehicle management server an authentication request from the client device, the authentication request including the vehicle identification and a user identification of the client device;
   authenticating by the vehicle management server the vehicle identification and the user identification to permit a continuously available state of the vehicle;
   sending by the vehicle management server a use permission to authenticate the continuously available state to the vehicle; and
   receiving by the vehicle the use permission to continue its available state;
   wherein the vehicle comprises
   a processor configured for:
   providing a client device with a vehicle identification when the vehicle is in an available state so that the client device can transmit the vehicle identification to the vehicle management server for the use permission; and
   continuing the available state based on the use permission;
   the vehicle further comprising:
   a stopping component for stopping the available state of the vehicle, wherein the processor is further configured to perform the following operations of:
   if the authenticating fails, receiving a stop command from the vehicle management server for stopping the available state of the vehicle, and controlling the stopping component to stop the available state of the vehicle after a first predetermined period;
   if a state of the vehicle is determined as a riding state, controlling the stopping component to stop the available state of the vehicle if the use permission is not received within a second predetermined period after the riding state starts, the vehicle further comprising:

at least one of a vibration component and a sound generating component, wherein the processor is further configured to perform the following operation of:

if the use permission is not received within a third predetermined period after the riding state starts, controlling at least one of the vibration component and the sound generating component to provide a stop prompt about stopping the available state for the user, the third predetermined period being less than the second predetermined period;

wherein the processor is further configured to perform the following operation of:

when the available state of the vehicle is stopped and is in a non-riding state, and if a duration of the non-riding state of the vehicle is longer than a fourth predetermined period, controlling the stopping component to activate the available state of the vehicle.

\* \* \* \* \*